United States Patent [19]

Ninane et al.

[11] Patent Number: 5,993,772
[45] Date of Patent: *Nov. 30, 1999

[54] METHOD FOR COPRODUCING CALCIUM CARBONATE AND SODIUM HYDROXIDE

[75] Inventors: Léon Ninane; Claude Criado; Francis Feys, all of Dombasle-sur-Meurthe, France

[73] Assignee: Solvay (Societe Anonyme), Brussels, Belgium

[ * ] Notice: This patent issued on a continued prosecution application filed under 37 CFR 1.53(d), and is subject to the twenty year patent term provisions of 35 U.S.C. 154(a)(2).

[21] Appl. No.: 08/860,567
[22] PCT Filed: Dec. 22, 1995
[86] PCT No.: PCT/EP95/05175
  § 371 Date: Sep. 12, 1997
  § 102(e) Date: Sep. 12, 1997
[87] PCT Pub. No.: WO96/21620
  PCT Pub. Date: Jul. 18, 1996

[30] Foreign Application Priority Data

Jan. 11, 1995 [FR] France ................... 95.00341

[51] Int. Cl.⁶ ........................................ C01F 5/24
[52] U.S. Cl. ............................................ 423/432; 423/165
[58] Field of Search ..................... 423/432, 165; 106/464

[56] References Cited

U.S. PATENT DOCUMENTS

| | | | |
|---|---|---|---|
| 1,188,505 | 6/1916 | Statham | 423/165 |
| 1,862,176 | 6/1932 | Church et al. | 423/432 |
| 2,062,255 | 11/1936 | Brooks et al. | 423/432 |
| 2,538,802 | 1/1951 | Schur et al. | 423/432 |
| 5,364,610 | 11/1994 | Merris, Jr. | 423/432 |

FOREIGN PATENT DOCUMENTS

| | | |
|---|---|---|
| 0413385 | 2/1991 | European Pat. Off. . |
| 1300007 | 6/1962 | France . |

*Primary Examiner*—Steven P. Griffin
*Assistant Examiner*—Stuart L. Hendrickson
*Attorney, Agent, or Firm*—Venable

[57] ABSTRACT

Process for the coproduction of calcium carbonate and sodium hydroxide, comprising causticizing sodium carbonate with milk of lime;

separating the calcium carbonate and the sodium hydroxide formed in the causticizing stage; and carbonating a mixture of milk of lime and of the calcium carbonate resulting from the causticizing stage.

10 Claims, No Drawings

METHOD FOR COPRODUCING CALCIUM CARBONATE AND SODIUM HYDROXIDE

FIELD OF THE INVENTION

The invention relates to a process for the coproduction of calcium carbonate and sodium hydroxide.

TECHNOLOGY REVIEW

Calcium carbonate and sodium hydroxide are used in large amounts in the paper industry, frequently in the form of aqueous suspensions of calcium carbonate and of caustic lyes. The manufacture of these products directly in these forms in satellite plants on the very site of the paper mills appears advantageous. It has been known for a long time that the causticizing of an aqueous sodium carbonate solution by means of the milk of lime generates calcium carbonate and sodium hydroxide. This process, conventionally known as causticizing, results in the formation of 2 mol of sodium hydroxide per mole of calcium carbonate produced, a ratio fixed by the stoichiometry of the chemical reaction involved ($Na_2CO_3 + Ca(OH)_2 \rightarrow 2\ NaOH + CaCO_3$). Causticizing thus does not make it possible to obtain the desired products in variable proportions suited to the specific requirements of the operating site. In addition, the quality of the calcium carbonate produced by causticizing is not suitable for certain grades of paper, in particular because of an excessively broad particle size distribution and of an excessive residual calcium hydroxide content. The calcium carbonate intended for these grades of paper is most often obtained by carbonation of a milk of lime by means of a gas containing $CO_2$, a process conventionally known as carbonation.

A process for the manufacture of calcium carbonate which can be used in particular as filler in the manufacture of paper has been provided in U.S. Pat. No. 1,188,505, according to which a calcium carbonate suspension obtained by causticizing is subjected to a carbonation, in order to convert the calcium hydroxide which might remain in the suspension into calcium carbonate. However, this process does not make it possible to obtain calcium carbonate of equivalent quality to that of the calcium carbonate prepared by carbonation nor to vary the ratio of the amounts of calcium carbonate and sodium hydroxide produced.

SUMMARY OF THE INVENTION

The present invention is aimed at overcoming the above-mentioned disadvantages by providing a process for the coproduction of calcium carbonate and sodium hydroxide which produces a calcium carbonate/sodium hydroxide ratio greater than the stoichiometric ratio of the causticizing reaction and which, simultaneously, provides calcium carbonate of equivalent quality to that of the calcium carbonate obtained by carbonation.

DETAILED DESCRIPTION OF THE INVENTION

The invention consequently relates to a process for the coproduction of calcium carbonate and sodium hydroxide which comprises the following stages (a) to (e), in which (a) sodium carbonate is reacted with milk of lime, so as to obtain an aqueous mixture comprising sodium hydroxide and solid calcium carbonate;

(b) a sodium hydroxide lye, on the one hand, and the said solid calcium carbonate, on the other hand, are separated from the said mixture, (c) at least a portion of the said solid calcium carbonate is mixed with a sufficient amount of milk of lime, so as to obtain a calcium carbonate and calcium hydroxide slurry which exhibits a ratio by weight of calcium hydroxide to calcium carbonate of at least 0.1;

(d) the said slurry is brought into contact with a gas comprising $CO_2$; and (e) an aqueous calcium carbonate suspension is collected from the stage (d).

The invention advantageously combines a causticizing stage (a) and a carbonation stage (d). This is because it has been observed, unexpectedly, that certain properties of calcium carbonate obtained by causticizing, in particular the particle size distribution of the particles, were improved when this calcium carbonate, as a mixture with milk of lime, is subjected to a subsequent carbonation.

The milk of lime employed in the stage (a) is an aqueous calcium hydroxide suspension. The milk of lime can be prepared by any known means, for example by suspending slaked lime or quicklime in an amount of water such that a stable calcium hydroxide suspension is obtained. The calcium hydroxide concentration in the milk of lime is typically from 50 to 400 g/l, advantageously from 100 to 250 g/l. The temperature at which the milk of lime is prepared and stored before being treated in the stage (a) is generally from 10 to 90° C., for example from 40 to 60° C.

In a first embodiment of the process according to the invention, the sodium carbonate is employed, in the stage (a), in the form of an aqueous solution. In this embodiment of the process, the sodium carbonate solution can be prepared by dissolving a sodium carbonate powder in an amount of water such that a stable solution is obtained. The concentration of the sodium carbonate solution must be suited to that of the milk of lime, so that, on mixing them, immediate supersaturation with respect to calcium carbonate is obtained and consequently crystallization of the calcium carbonate. The concentration of the sodium carbonate solution is, for example, between 50 g/l and saturation (465 g/l at 35° C.). Use is advantageously made of a solution containing from 100 to 400 g/l of sodium carbonate, concentrations of 150 to 300 g/l being highly suitable. In this embodiment of the process according to the invention, the aqueous sodium carbonate solution is advantageously prepared and stored, before being treated in the stage (a), at a temperature of 20 to 90° C., for example of 40 to 60° C.

In a second embodiment of the process according to the invention, the sodium carbonate is employed, in the stage (a), in the solid form, generally in the form of a powder. Use is preferably made of a powder characterized by a mean particle diameter of 50 to 500 mm.

The milk of lime and the sodium carbonate are mixed in the stage (a) in respective amounts which are sufficient to provide for as complete a conversion as possible of the sodium carbonate into calcium carbonate. The operation is most often carried out with a molar excess of calcium hydroxide with respect to the stoichiometric amount. In an alternative form of the process, all the milk of lime which will be converted into calcium carbonate in the stages (a) and (d) of the process is introduced in the stage (a). The stage (a) is preferably implemented with a calcium hydroxide excess of 1 to 20% with respect to the stoichiometric amount which reacts with the sodium carbonate. In a particularly preferred way, this excess is limited to 2 to 10%.

The stage (a) can be carried out at any temperature greater than or equal to 10° C. and less than 100° C. It is preferable to use a temperature greater than or equal to 20° C., more particularly of at least 30° C., values of at least 35° C. being preferred; the temperature is generally limited to a maximum of 70° C., preferably to a maximum of 60° C., values not exceeding 55° C. being recommended.

The duration of the stage (a) must be sufficient to provide for as complete a reaction as possible between the sodium carbonate and the calcium hydroxide of the milk of lime. It is generally at least 10 minutes, preferably at least 30 minutes. The duration most often does not exceed 2 hours. Advantageously, it does not exceed 90 minutes.

The aqueous mixture collected from the stage (a) of the process comprises a suspension of solid calcium carbonate and, optionally, of solid calcium hydroxide in an aqueous sodium hydroxide solution (the caustic lye).

In the stage (b), the solid calcium carbonate and the caustic lye produced by causticizing in the stage (a) are separated. This separation can be carried out by any known means, for example by filtration and washing. The caustic sodium hydroxide lye, on the one hand, and the solid calcium carbonate, on the other hand, are thus collected. The concentration of the caustic lye obtained is typically from 6 to 12% by weight. Depending on the method of separation used, the calcium carbonate is collected in the form of an aqueous suspension or of a wet cake typically containing from 20 to 70% of solid matter.

In the stage (c) of the process, a slurry is formed by mixing at least a portion of the calcium carbonate collected in the stage (b) with milk of lime.

The milk of lime employed in the stage (c) can be obtained in a way similar to that employed in the stage (a). It can have a concentration identical to or different from that of the milk of lime employed in the stage (a). Use is advantageously made of milks of lime with the same concentrations in the stages (a) and (c). In practice, milk of lime is generally prepared in a single tank and a portion thereof is used in the stage (a) and another portion thereof in the stage (c).

The ratio by weight of the calcium hydroxide to the calcium carbonate employed in the stage (c) can vary within wide limits. To obtain a calcium carbonate of satisfactory quality, this ratio must be at least equal to 0.1. It is preferably equal to 0.2. In a particularly preferred way, it is at least 0.3. Although it is possible to carry out the process according to the invention with a very high ratio by weight of the calcium hydroxide to the calcium carbonate, this ratio generally does not exceed 10. Most often, it does not exceed 5. Advantageously, it does not exceed 3.

The total calcium carbonate and calcium hydroxide concentration in the slurry of the stage (c) is typically from 100 to 600 g/l, advantageously from 150 to 500 g/l.

In the stage (d) of the process, a gas containing carbon dioxide is introduced into the slurry of the stage (c), in order to carbonate it.

The gas employed in the stage (d) can be undiluted carbon dioxide or a gas mixture containing it. When it is a gas mixture, the carbon dioxide concentration in the mixture is generally at least 5% by volume, preferably at least 10% by volume. The other constituents of the gas mixture can be all gases which are inert with respect to calcium carbonate and calcium hydroxide, such as nitrogen and/or oxygen. Gas mixtures which can be used are, for example, combustion gases which have been rid beforehand of the impurities which they contain, in particular dust.

The temperature at which the stage (d) is carried out is generally controlled so as not to exceed 85° C. It is generally maintained at at least 10° C. It is preferably maintained in the range from 30 to 60° C.

The introduction of the gas into the slurry of the stage (c) is generally adjusted so as to bring in contact from 0.2 to 20 standard liters, preferably from 0.3 to 5 standard liters, of carbon dioxide per hour and per gram of calcium hydroxide in the slurry. The introduction of the gas is continued until virtually all the calcium hydroxide has been converted into calcium carbonate. As a general rule, the gas is introduced for a duration of 30 minutes to 3 hours. A satisfactory conversion is most often obtained after a duration of 45 to 90 minutes.

The stages (c) and (d) of the process according to the invention can be carried out simultaneously. However, in practice, it is preferable to carry them out successively.

In the stage (e) of the process according to the invention, an aqueous calcium carbonate suspension is collected with a calcium carbonate concentration typically of 15 to 70% by weight, most often of 20 to 50% by weight. This suspension can be used, as is or after concentrating, in various conventional applications of calcium carbonate where the latter is employed in the form of an aqueous suspension. As an alternative form, the aqueous calcium carbonate suspension collected in the stage (e) is treated in order to withdraw the calcium carbonate therefrom in the form of a dry powder. To this end, it can be filtered, centrifuged or separated by settling and the wet calcium carbonate can then be dried by evaporating.

The process according to the invention makes it possible, for a given sodium hydroxide production, to produce calcium carbonate in an amount greater than the stoichiometric amount. Whereas a conventional causticizing process produces calcium carbonate and sodium hydroxide in a ratio by weight of 1.25:1 (molar ratio 1:1), the process according to the invention makes it possible to increase this ratio, typically up to values of over 5:1, indeed of the order of 10:1, by an appropriate adjustment of the ratio by weight of the calcium hydroxide to the calcium carbonate employed in the stage (c). This characteristic of the process according to the invention makes it particularly attractive to exploit the process directly on the site of integrated paper mills. This is because these mills are consumers both of calcium carbonate and of sodium hydroxide in variable proportions which the process according to the invention can produce.

In addition, although, in the process according to the invention, a fraction of the calcium carbonate is produced by causticizing sodium carbonate and another fraction by carbonation of a milk of lime, a single type of calcium carbonate is finally obtained. This calcium carbonate of excellent and homogeneous quality can be used in particular in papermaking, in plastics and in paints. It is particularly well suited as filler and coating material for paper. With respect to the causticizing calcium carbonate, the calcium carbonate obtained in the process according to the invention exhibits in particular a narrower particle size distribution of the particles. This is because the calcium carbonate obtained in the process according to the invention generally exhibits a particle size slope s of 0.9 to 1.5, whereas the causticizing calcium carbonate conventionally exhibits a particle size slope s of 1.3 to 2.2, the particle size slope s being defined by the following relationship:

$$\sigma = \frac{D90 - D10}{D50}$$

in which $D_{90}$ ($D_{50}$ and $D_{10}$ respectively) represents the diameter for which 90% (50% and 10% respectively) of the particles (expressed by weight) have a diameter of less than $D_{90}$ ($D_{50}$ and $D_{10}$ respectively). The calcium carbonate obtained in the process according to the invention generally exhibits a $D_{50}$ of 5.0 to 7.5 mm, whereas the causticizing calcium carbonate conventionally exhibits a $D_{50}$ of 4.8 to 6.5. These parameters are defined by the method of particle size analysis by laser beam scattering using a measurement device of Malvern® trademark (type 2600 C).

The calcium carbonate obtained in the process according to the invention generally exhibits, in addition a whiteness (W) (measured at a wavelength of 457 mm) at least equal to 95% of the reference value of barium sulphate;

a residual calcium hydroxide content (H) (measured by the amount of OH ions produced by reaction at pH 9.5 for 20 minutes with hydrochloric acid) of less than 2% by weight, values of less than 1% by weight being the most common.

a size of the elemental crystals ($S_p$) constituting the powder particles (defined by a measurement of the permeability to air by means of a device of the Blaine permeameter type according to ASTM Standard C 204-51 in force in the analysis of cements and corresponding substantially to the sizes recorded by measurement with a microscope under a magnification of 15,000 to 25,000×) of at least 0.05 mm, generally of at least 0.15 mm, and of at most 1 mm, generally of at most 0.75 mm, values of 0.20 to 0.40 mm being the most common.

EXAMPLES

The examples which are described below serve to illustrate the invention. In these examples, calcium carbonate powders have been manufactured by means of the process according to the invention. The symbols $S_p$, $D_{50}$, σ, W and H used in these examples have been defined above.

Example 1

543 g of a milk of lime with a concentration of 2.02M were introduced into a reactor with a capacity of 1.5 l which is provided with a jacket, in which jacket circulates an oil which enables the temperature of the reactor to be adjusted, and which is equipped with an anchor-shaped stirrer. By maintaining the temperature in the reactor at 50° C., 109 g of sodium carbonate powder and 543 g of water were added thereto with stirring over approximately 15 minutes and then stirring was maintained for 1 hour. The aqueous mixture resulting from the causticizing was collected and filtered and 820 ml of a lye containing 6.63% by weight of NaOH and a cake of calcium carbonate particles were thus collected, which cake was then washed with demineralized water. The resulting cake contained 30% by weight of calcium carbonate (subsequently known as causticizing calcium carbonate). A sample of the causticizing calcium carbonate cake was removed and analysed. The results appear in Table I below. The causticizing calcium carbonate cake was reintroduced into the reactor, with 933 g of milk of lime with a concentration of 2.02M. With stirring and while maintaining the temperature of the reactor at 40° C., a mixture of $CO_2$ and air containing 10% by volume of $CO_2$ was injected via the bottom of the reactor for 80 minutes at a flow rate of 1250 l/h. The calcium carbonate suspension formed was then collected and filtered and the cake obtained was dried. 275 g of powdered calcium carbonate in accordance with the invention were obtained, which product was analysed. The results appear in Table I.

TABLE I

| | Causticizing calcium carbonate | Calcium carbonate in accordance with the invention |
|---|---|---|
| Sp | 0.29 | 0.28 |
| $D_{50}$ | 6.4 | 7.4 |
| σ | 1.4 | 1.2 |
| W | 98.1 | 97.5 |
| H | n.d. | 1.56 |

Example 2

2180 g of a milk of lime with a concentration of 1.81M were introduced into a reactor with a capacity of 3 l which is provided with a jacket, in which jacket circulates an oil which makes it possible to adjust the temperature of the reactor, and which is equipped with an anchor-shaped stirrer. While maintaining the temperature of the reactor at 50° C., 399 g of sodium carbonate powder and 1131 g of water were added thereto with stirring over approximately 15 minutes and then the stirring was maintained for 1 hour. The aqueous mixture resulting from the causticizing was collected and filtered and 2324 ml of a lye containing 8.41% by weight of NaOH and a cake of causticizing calcium carbonate particles were thus collected, which cake was then washed with demineralized water. The resulting cake contained 30% by weight of calcium carbonate. A sample of the causticizing calcium carbonate cake was removed and analysed. The results appear in Table II below. The causticizing calcium carbonate cake was reintroduced into the reactor, with 1354 g of milk of lime with a concentration of 2.09M. With stirring and while maintaining the temperature of the reactor at 50° C., a mixture of $CO_2$ and air containing 10% by volume of $CO_2$ was injected via the bottom of the reactor for 100 minutes at a flow rate of 1250 l/h. The calcium carbonate suspension formed was then collected and filtered and the cake obtained was dried. 628 g of powdered calcium carbonate in accordance with the invention were obtained, which product was analysed. The results appear in Table II.

TABLE II

| | Causticizing calcium carbonate | Calcium carbonate in accordance with the invention |
|---|---|---|
| Sp | 0.15 | 0.28 |
| $D_{50}$ | 4.9 | 5.4 |
| σ | 1.9 | 1.1 |
| H | 4.65 | 0.82 |

Tables I and II show the improvement introduced by the invention as regards the quality of the calcium carbonate obtained, in particular as regards the particle size distribution and the residual calcium hydroxide content.

What is claimed is:

1. In a process for the coproduction of calcium carbonate and sodium hydroxide, which comprises the following stages (a) to (e):

(a) reacting sodium carbonate with milk of lime, so as to obtain an aqueous mixture comprising sodium hydroxide and solid calcium carbonate;

(b) individually separating a sodium hydroxide lye, and said solid calcium carbonate, from said mixture;

(c) slurrying at least a portion of said calcium carbonate from stage (b) and collecting an aqueous slurry of calcium carbonate;

(d) contacting said slurry with a gas comprising $CO_2$; and (e) collecting an aqueous calcium carbonate suspension from stage (d);

the improvement consisting in that said slurrying in stage (c) comprises mixing said calcium carbonate with milk of lime in an amount such that said slurry exhibits a ratio by weight of calcium hydroxide to calcium carbonate of at least 0.1.

2. The process according to claim 1, in which the ratio by weight of the calcium hydroxide to the calcium carbonate in the stage (c) is at least equal to 0.2 and does not exceed 10.

3. The process according to claim 2, in which the ratio by weight of the calcium hydroxide to the calcium carbonate in the stage (c) is from 0.3 to 5.

4. The process according to claim 1, in which the total calcium carbonate and calcium hydroxide concentration in the slurry of the stage (c) is from 100 to 600 g/l.

5. The process according to claim 1, in which the stage (a) is carried out at a temperature of from 10 to less than 100° C.

6. The process according to claim 1, in which the stage (d) is carried out at a temperature of at most 85° C.

7. A process for the coproduction of calcium carbonate and sodium hydroxide which comprises the following stages (a) to (e), comprising:

(a) reacting sodium carbonate with milk of lime at a temperature from 10° to less than 100° C., to produce an aqueous mixture comprising sodium hydroxide and solid calcium carbonate;

(b) individually separating a sodium hydroxide lye, and said solid calcium carbonate, from said mixture;

(c) mixing at least a portion of said solid calcium carbonate with a sufficient amount of milk of lime, to produce a calcium carbonate and calcium hydroxide slurry having a total concentration of calcium carbonate and calcium hydroxide from 100 to 600 g/l and which exhibits a ratio by weight of calcium hydroxide to calcium carbonate from 0.3 to 5;

(d) contacting said slurry with a gas comprising $CO_2$ at a temperature of at most 85° C. to produce an aqueous calcium carbonate suspension; and (e) collecting said aqueous calcium carbonate suspension from stage (d).

8. A process for the coproduction of calcium carbonate and sodium hydroxide which comprises the following stages (a) to (e):

(a) reacting sodium carbonate with milk of lime, so as to obtain an aqueous mixture comprising sodium hydroxide and solid calcium carbonate having a mean particle size $D_{50}$ of from 4.8 to 6.5 μm;

(b) individually separating a sodium hydroxide lye, and said solid calcium carbonate, from said mixture;

(c) mixing at least a portion of said calcium carbonate from stage (b) with milk of lime in an amount so adapted as to obtain a calcium carbonate and calcium hydroxide slurry which exhibit a ratio by weight of calcium hydroxide to calcium carbonate of at least 0.1;

(d) contacting said slurry with a gas comprising $CO_2$; and (e) collecting an aqueous calcium carbonate suspension from stage (d).

9. The process according to claim 8, in which said aqueous calcium carbonate suspension in stage (e) has a particle size diameter $D_{50}$ of from 5.0 to 7.5 mm.

10. The process according to claim 8, in which said aqueous calcium carbonate suspension in stage (e) has a particle size diameter $D_{50}$ of from 5.0 to 7.5 mm and a particle size slope of from 0.9 to 1.5.

* * * * *